Figure 1:
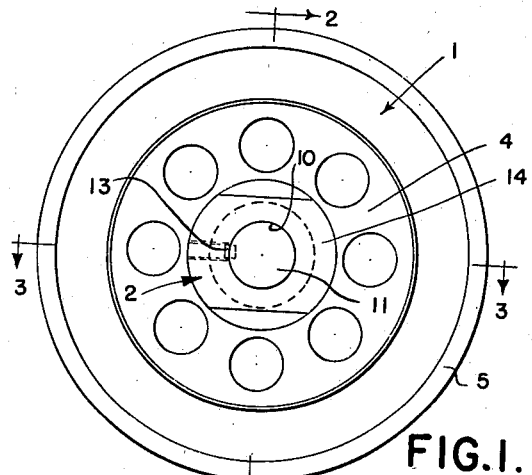

Aug. 26, 1941.  C. L. EPPLER  2,253,774

SHEAVE

Filed Oct. 16, 1939

INVENTOR.
CHRISTIAN L. EPPLER
BY Whittemore Hulbert Belknap
ATTORNEYS

Patented Aug. 26, 1941

2,253,774

UNITED STATES PATENT OFFICE 2,253,774

SHEAVE

Christian L. Eppler, Detroit, Mich., assignor to Midwest Tool & Manufacturing Company, Detroit, Mich., a corporation of Michigan Application October 16, 1939, Serial No. 299,750

4 Claims. (Cl. 74—230.8)

The invention relates to sheaves and refers more particularly to sheaves formed to fit standard V-type belts.

The invention has for an object to so form a unit construction sheave as to provide flexibility in range of sheave units and reduce the amount of stock carried.

The invention has for another object to provide an improved sheave unit in which the sheaves have interfitting driving engagement.

The invention has for a further object to provide an improved mounting for the sheaves.

With these and other objects in view, the invention resides in the novel features of construction and combinations and arrangements of parts as more fully hereinafter set forth.

Figure 2:
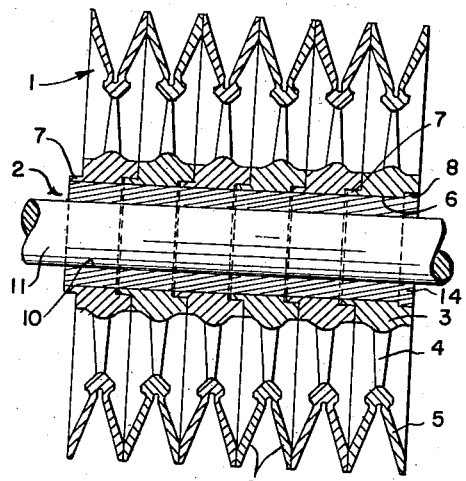
Figure 3:
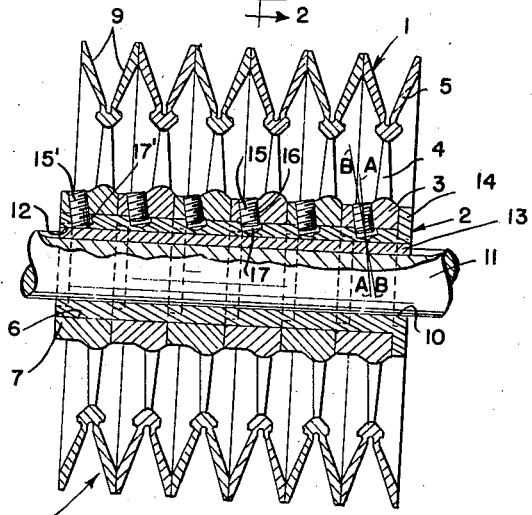
Figure 4:
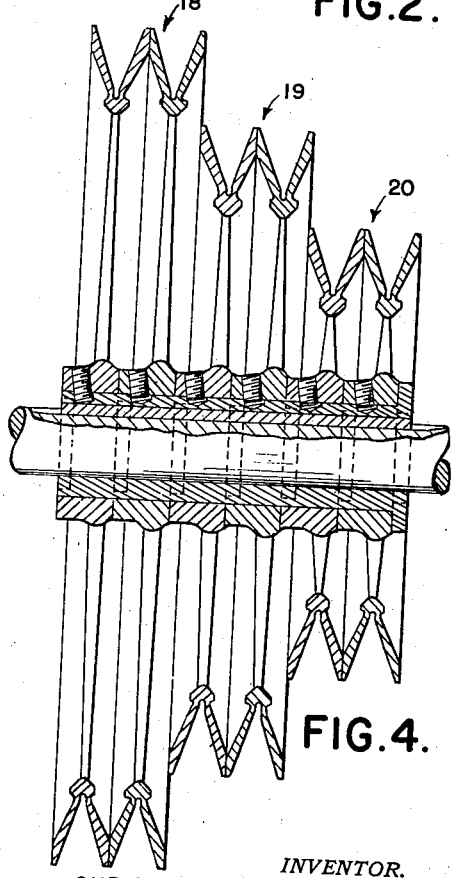
Figure 5:
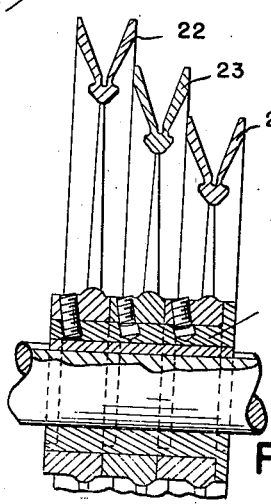

In the drawing:

Figure 1 is an end elevation of a unit construction sheave embodying my invention;

Figures 2 and 3 are cross sections on the lines 2—2 and 3—3, respectively, of Figure 1;

Figures 4 and 5 are views similar to Figure 3 showing other embodiments of my invention.

Referring to Figures 1, 2 and 3, the sheave unit is formed of the interchangeable sheaves 1 and the bushing 2. Each sheave comprises the hub 3, the web 4 and the rim 5. The hub has the cylindrical axial bore 6 therethrough and it has at one end the tongue 7 and at the other end the groove 8. The tongue and groove extend diametrically and the width of the tongue is substantially, but preferably slightly less than that of the groove so that in the sheave unit the tongue of one sheave fits in the groove of the adjacent sheave. The web, as illustrated, is in the nature of a disc having circumferential openings therethrough to, in effect, form spokes and in this connection it is apparent that differently shaped openings may be used and that the web may have spokes extending completely from the hub to the rim. The rim has the radially outwardly diverging flanges 9 which together form a peripheral groove for receiving and fitting a standard V-type belt.

The sheave is preferably formed of malleable iron and the inside faces of its flanges which form the side walls of the groove are very smooth and highly burnished to possess efficient belt driving contact and to eliminate undue belt wear.

The bushing is formed of suitable material which, in the present instance, is preferably cast iron. The bushing is of a length to accommodate the sheaves and the outside diameter of the bushing is substantially the same as the diameter of the bores of the sheaves so that the bushing fits the bores. The bushing has the axial bore 10 therethrough of a diameter to fit a standard shaft 11 and also has a keyway 12 extending longitudinally therethrough for receiving the key 13 which connects the bushing and shaft. The widths or axial dimensions of the portions of the hubs 3 of the sheaves, omitting the tongues 7, are the same as the maximum widths or axial dimensions of the rims 5 of the sheaves so that with the sheaves mounted upon the bushing and their hubs in end to end contact the rims are also in contact, thereby producing a strong construction of sheave unit.

For the purpose of effectively securing the sheaves to the bushing, one end of the latter is formed with the flange 14, diametrically opposite sides of which are flatted so that this flange, in effect, forms a tongue for fitting the groove 8 of the adjacent sheave. Furthermore, the flange forms an abutment for limiting the axial movement of the adjacent sheave in one direction. Each sheave is fixedly secured to the bushing by means of the set screw 15 which threadedly engages the transverse opening 16 in the hub of the sheave and has wedge engagement at its inner end with the wall of the recess 17 formed in the bushing. The axes of the associated hole 16 and recess 17 are preferably inclined to the median plane of the sheave in a direction radially inwardly and axially toward the flange at the end of the bushing. The axis of the recess is inclined at a greater angle than the axis of the opening, as indicated by the lines A—A and B—B in Figure 3, so that as the screw is threaded into the opening and its inner end passes therethrough into the recess it has a wedging engagement with the wall of the recess and forces the sheave axially in a direction toward the flange at the end of the bushing. The recess 17' in the sheave at the end of the bushing opposite the flange extends completely through the bushing so that the screw 15' for securing this end sheave may seat at its inner end on the key 13.

With this mounting, the sheaves are effectively secured to the bushing in driving relation to each other and also the bushing. Also the unit, including the sheaves and bushing, is effectively secured to the shaft for the unit.

For the purpose of providing great flexibility in range of sheave units and also reducing the amount of stock carried by the dealer, the sheaves and also the bushings are manufactured in different groups or series. Each group of sheaves comprises interchangeable sheaves of the same bore and various outside diameters or various peripheral groove diameters. Each group of bushings comprises bushings of the same bore and outside diameter and various lengths to accommodate different numbers of sheaves for fitting the bushings. The bores and outside diameters of one group of bushings differ from those of another group so that the bushings can be used with shafts of different diameter and also with sheaves having bores of different diameter. As a result, certain of the sheaves of one group of sheaves may be selected and a certain bushing having the desired bore to fit a certain shaft and the outside diameter to fit the bore of the selected sheaves and also the length to accommodate the number of selected sheaves may be selected, after which the selected sheaves are assembled with and effectively secured upon the selected bushing.

Figure 4 illustrates a sheave unit differing from the sheave unit illustrated in Figures 1, 2 and 3 only in that three pairs of sheaves, 18, 19 and 20, of different outside diameters are mounted on the bushing. The method of mounting is the same.

Figure 5 shows another sheave unit mounted upon a shaft of different diameter than the shaft 11. The bore of the bushing 21 of this unit is such that the bushing fits the shaft. Three sheaves, 22, 23 and 24, of different outside diameter and also having a bore of different diameter than the bore of the sheaves 1 are mounted on the bushing 21, the outside diameter of which is such that the bushing fits the sheaves. The length of the bushing 21 is less than that of the bushing 2 to accommodate the three sheaves mounted on the bushing. The method of mounting and securing the sheaves to the bushing is the same as illustrated in Figures 1, 2 and 3.

From the above description, it will be seen that the amount of stock required comprises the different groups of sheaves and the different groups of bushings. The proper combination will produce a wide range of unit construction sheaves.

What I claim as my invention is:

1. A sheave unit comprising a bushing having a transverse recess, a sheave having a hub, a web and a peripherally grooved rim, said hub having a transverse opening with its axis inclined to the axis of the recess in said bushing and a member for securing said sheave to said bushing, said member being secured in the opening and having wedging engagement with the wall of the recess.

2. A sheave unit comprising a bushing having a transverse shoulder and provided with a transverse recess inclined radially inwardly and axially towards said shoulder, sheaves having hubs adapted to be sleeved upon said bushing, each sheave also having a web and a peripherally grooved rim, the hub of each sheave having a transverse opening with its axis extending generally in the direction of the axis of the recess but inclined relative thereto, and means for detachably securing said sheave upon said bushing comprising a member secured in the opening of each hub and having wedging engagement with the wall of the associated recess for forcing said sheaves in a direction towards said shoulder.

3. A multiple sheave unit comprising a bushing, a plurality of separately formed sheaves mounted on said bushing, each sheave having a hub, a web and a peripherally grooved rim, the hubs of said sheaves being alike and each having a tongue at one end and a groove at the other end with the tongue of one hub in interlocking engagement with the groove of the adjacent hub, said bushing having at one end means in interlocking engagement with the end of the adjacent hub, and means engaging each of said hubs for detachably securing said sheaves individually to said bushing and in interlocking relation to said bushing and each other in a manner to permit ready removal of said bushing and one or more of said sheaves whereby the length of said bushing as well as the number of said sheaves may be varied.

4. A multiple sheave unit comprising a bushing having a flange at one end, a plurality of separately formed sheaves mounted on said bushing, each sheave having a hub, a web and a peripherally grooved rim, the hubs of said sheaves being alike, cooperating means on the ends of said hubs and said bushing flange for interlocking said sheaves to each other and to said bushing, and means engaging each of said hubs for urging the same toward said bushing flange to maintain the interlocking relation and for detachably securing said sheaves individually to said bushing in a manner to permit ready removal of said bushing and one or more of said sheaves whereby the length of said bushing as well as the number of said sheaves may be varied.

CHRISTIAN L. EPPLER.